United States Patent
Banerjee et al.

(10) Patent No.: US 11,012,540 B2
(45) Date of Patent: May 18, 2021

(54) DYNAMIC RETRANSMISSION TIMEOUT VALUES

(71) Applicant: International Business Machines Corporation, Armonk, NY (US)

(72) Inventors: Dwip N. Banerjee, Austin, TX (US); David Richard Marquardt, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/524,405

(22) Filed: Jul. 29, 2019

(65) Prior Publication Data

US 2021/0037119 A1    Feb. 4, 2021

(51) Int. Cl.
*H04W 24/00* (2009.01)
*H04L 29/06* (2006.01)
*H04L 5/00* (2006.01)
*H04L 1/18* (2006.01)

(52) U.S. Cl.
CPC ............ *H04L 69/163* (2013.01); *H04L 1/188* (2013.01); *H04L 5/0055* (2013.01); *H04L 69/28* (2013.01)

(58) Field of Classification Search
CPC ......... H04L 1/1809; H04L 1/188; H04L 1/20; H04L 29/06; H04L 47/10; H04L 69/163; H04L 47/27; H04L 47/283; H04L 47/37; H04L 69/16; H04L 69/28; H04L 47/193; H04L 14/0268; H04L 41/5025; H04L 41/0654; H04L 45/28; H04L 47/12; H04L 49/557; H04L 69/40; H04W 28/18; H04W 24/00; H04J 2203/006

See application file for complete search history.

(56) References Cited

U.S. PATENT DOCUMENTS

| | | | |
|---|---|---|---|
| 6,901,081 B1 * | 5/2005 | Ludwig | H04L 1/1809 370/519 |
| 7,417,956 B2 * | 8/2008 | Nakazawa | H04L 47/10 370/252 |
| 9,191,862 B2 * | 11/2015 | Paddon | H04W 28/18 |
| 2004/0017784 A1 * | 1/2004 | Backlund | H04L 1/188 370/256 |
| 2013/0058231 A1 * | 3/2013 | Paddon | H04L 1/188 370/252 |
| 2015/0288586 A1 | 10/2015 | McClellan | |
| 2017/0019338 A1 * | 1/2017 | Song | H04L 47/11 |
| 2017/0180486 A1 * | 6/2017 | Mehta | H04L 43/0823 |
| 2017/0331577 A1 * | 11/2017 | Parkvall | H04L 5/1469 |
| 2018/0368021 A1 * | 12/2018 | Jung | H04L 47/20 |

* cited by examiner

*Primary Examiner* — Jung Liu
(74) *Attorney, Agent, or Firm* — Jay Wahlquist

(57) ABSTRACT

One example of a computer-implemented method of adaptively setting Transmission Control Protocol (TCP) Retransmission TimeOut (RTO) values comprises establishing a connection between a sender node and a receiver node using TCP; determining a network location of the receiver node relative to the sender node; and dynamically setting, by the sender node, an RTO minimum value for the receiver node based on the determined network location of the receiver node relative to the sender node.

17 Claims, 3 Drawing Sheets

DYNAMIC RETRANSMISSION TIMEOUT VALUES

BACKGROUND

In many protocols, such as Transmission Control Protocol (TCP), if an acknowledgment (ACK) message is not received within a specified time period, the corresponding packet is retransmitted. If too many ACK messages are missing, a Retransmission Time Out (RTO) occurs. During an RTO, the sender node ceases sending packets for a certain amount of time.

SUMMARY

Aspects of the disclosure may include a computer-implemented method, computer program product, and system of adaptively setting Transmission Control Protocol (TCP) Retransmission TimeOut (RTO) values. One example of the computer-implemented method comprises establishing a connection between a sender node and a receiver node using TCP; determining a network location of the receiver node relative to the sender node; and dynamically setting, by the sender node, an RTO minimum value for the receiver node based on the determined network location of the receiver node relative to the sender node.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
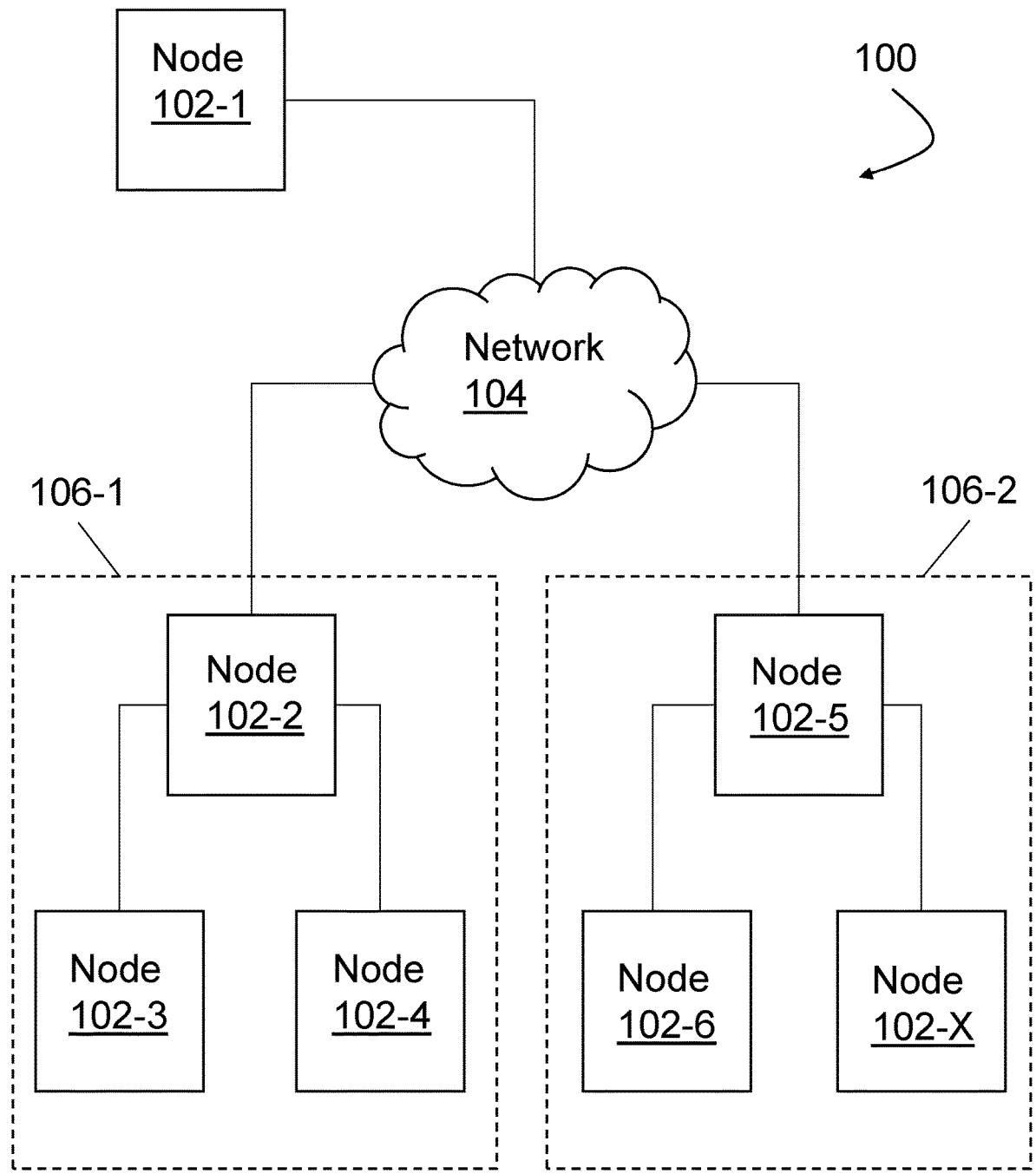
FIG. 1 is a high-level block diagram of one embodiment of an example system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a high-level block diagram of one embodiment of an example system 100. The example system 100 includes nodes 102-1 . . . 102-X (referred to herein collectively as nodes 102), where X is the total number of nodes. The example system 100 also includes a network 104. The network 104 can be implemented using any number of any suitable physical and/or logical communications topologies. The network 104 can include one or more private or public computing networks. For example, network 104 may comprise a private network (e.g., a network with a firewall that blocks non-authorized external access) that is associated with the workload. Alternatively, or additionally, network 104 may comprise a public network, such as the Internet. Thus, network 104 may form part of a packet-based network, such as a local area network, a wide-area network, and/or a global network such as the Internet. Network 104 can include one or more servers, networks, or databases, and can use one or more communication protocols to transfer data between nodes 102. For example, in this illustrative embodiment, the network 104 and nodes 102 are configured to implement the Transmission Control Protocol (TCP) for communicating data between nodes 102. Furthermore, although illustrated in FIG. 1 as a single entity, in other examples, network 104 may comprise a plurality of networks, such as a combination of public and/or private networks. The communications network 104 can include a variety of types of physical communication channels or "links." The links can be wired, wireless, optical, and/or any other suitable media. In addition, the communications network 104 can include a variety of network hardware and software for performing routing, switching, and other functions, such as routers, switches, base stations, bridges or any other equipment that may be useful to facilitate communicating data.

The nodes 102 can be implemented as any device configured to communicate over network 104, such as, but not limited to, a server, desktop computer, laptop computer, smart phone or other smart device, or a component thereof, etc. Additionally, the nodes 102 can be implemented, in some embodiments, as virtual machines executing one or more virtual processors using techniques known to one of skill in the art.

As discussed above, each of the nodes 102 communicates with one or more other nodes 102 via network 104 using a communication protocol, such as TCP. For example, a node 102 can execute a plurality of applications which send and receive packets of data over network 104. As understood by one of skill in the art, a receiver node that receives a packet transmits an acknowledgement (ACK) to the sender node to indicate that the packet has been received. Different techniques can be used for transmitting ACKs, as known to one skill in the art, such as sending group ACKs for a plurality of packets, one ACK for each received packet, etc. In many protocols, such as TCP, if an ACK is not received within a specified time period, the corresponding packet is retransmitted. If too many ACKs are missing, a Retransmission Time Out (RTO) occurs. The number of missing ACKs to trigger an RTO can be set in the configuration settings. During an RTO, the sender node ceases sending packets for a minimum amount of time. This time for ceasing transmission of packets is referred to as RTOmin. In conventional systems implementing TCP, the RTOmin can be between 1 to 3 seconds. The RTOmin is typically configured statically in the configuration settings in conventional systems. After the RTOmin time has elapsed, the sender node begins transmitting packets again. In beginning to transmit packets after an RTO, the sender node can gradually increase the number of packets being sent as it determines if sufficient ACKs are being received.

In the embodiments described herein, the nodes 102 are configured to dynamically adjust the RTOmin based on the network location of the receiver node (e.g. communication endpoint). As used herein, the network location (also referred to herein simply as 'location') refers to the location of the receiver node in the network topology relative to the sender node as opposed to a geographic physical location. The location of the receiver node can be determined by the sender node through various techniques and varies based on the implementation, network configuration, protocol, etc. In particular, in some embodiments, the sender node can determine the location of the receiver node while establishing a connection with the receiver node. For example, to establish a connection using TCP, a three-way handshake procedure is used in which a first node initiates a connection to a second node by sending a SYN synchronize packet. After receiving the SYN packet, the second node responds with a SYN-ACK acknowledgement. Once the first node receives the SYN-ACK packet, the first node sends an ACK acknowledgement to the second node to complete the three-way handshake. During this process, each of the first and second nodes can extract information regarding the location of the other node.

For example, the first and second nodes can determine if the other node is in the same subnet based on the Internet Protocol (IP) address of the respective nodes. Similarly, the first and second nodes can determine if the respective nodes are on the same Logical Partition (LPAR) or on different LPARs communicating through a common host based on the respective address of the first and second nodes and/or on a communication path between the nodes. For example, in some example implementations, group 106-1 is a first LPAR and group 106-2 is a second LPAR. In other embodiments, the first and second nodes are configured to determine if the respective nodes are on implemented on the same virtual machine (e.g. a same Linux® virtual machine).

It is to be understood that other techniques can be used for determining the network location of the receiver node and that the specific technique used will vary based on the protocol used and/or network topology, etc. For example, in some embodiments, the nodes 102 are implemented as part of a Kubernetes cluster. In some such example implementations of FIG. 1, for example, nodes 102-2 and 102-5 can be implemented as cluster masters and nodes 102-3, 102-4, 102-6, and 102-X are worker machines in the respective clusters 106-1 and 106-2, in some embodiments. In some such embodiments, the nodes 102 can determine the network location of the other nodes 102 with which they are communicating through use of a configuration file. For example, the cluster masters can write into the configuration file which IP addresses and/or other parameters indicate a node that is local to the cluster.

The network location information of a receiver node is then used by a sender node to dynamically adjust the RTOmin for the connection between the sender node and the receiver node. It is to be understood that each of the nodes 102 can be both a sender node and a receiver node simultaneously. For example, node 102-3 can be in communication with node 102-4 and both sends packets to and receives packets from node 102-4. Thus, node 102-3 is both a sender node and a receiver node for node 102-4 and node 102-4 is both a sender node and a receiver node for node 102-3. Similarly, node 102-6 can be in communication with both node 102-2 and node 102-1. Node 102-6 can be a sender node for packets sent to node 102-1 and a receiver node for packets received from node 102-2.

For purposes of illustration, the following example implementations for dynamically adjusting the RTOmin are described below with respect to specific nodes shown in FIG. 1. However, it is to be understood that each of the nodes 102 can be configured to dynamically adjust the RTOmin for a given receiver node. In one example, node 102-3 establishes communication with node 102-2, node 102-4, node 102-6, and node 102-1. In establishing communication with the above nodes, node 102-3 determines that nodes 102-4 is on the same subnet as node 102-3 and that node 102-2 is in the same LPAR, but not on the same subnet. Node 102-3 also determines that node 102-6 is not on the same LPAR, but is otherwise on a localized domain (e.g. on a separate LPAR, but communicating through a common host). Node 102-3 also determines that node 102-1 is communicating over a wide area network (WAN) such as the internet.

In response to determining the network location of nodes 102-2, 102-4, 102-6, and 102-1, node 102-3 dynamically adjusts a respective RTOmin for communications with each of nodes 102-2, 102-4, 102-6, and 102-1. In other words, node 102-3 can set a different RTOmin for each of the respective nodes based on the nodes' respective network locations. For example, in one embodiments, node 102-3 sets a more aggressive or shorter RTOmin for node 102-4, which is on the same subnet, than for the other nodes. In some embodiments, the RTOmin for nodes on the same subnet can be set to a value on the order of 10 s of milliseconds. Additionally, the node 102-3 can set a different RTOmin for nodes 102-2 and 102-6 which is longer than the RTOmin for node 102-4, but shorter than for node 102-1. For example, in some embodiments, the RTOmin for nodes connected over the internet, such as node 102-1 in this example, is on the order of seconds. In particular, since node 102-1 is connected to the node 102-3 over the internet, the RTOmin for node 102-1 can be set according to the TCP standards, such RFC 793, which typically has a lower bound of approximately 1 second, in some embodiments. Additionally, in some embodiments, the RTOmin for nodes 102-2 (on the same LPAR) and node 102-6 (on different LPAR) can be the same. In other embodiments, the RTOmin for nodes 102-2 (on the same LPAR) and node 102-6 (on a different LPAR) are set to different values.

In addition, in some embodiments, nodes 102 consider additional factors in dynamically setting the RTOmin for a given connection. For example, in some embodiments, a lower or minimum bound is calculated for the dynamic RTOmin to help mitigate the effects of possible spurious retransmissions. In some such embodiments, the lower bound is calculated as a factor of a delayed ACK value (e.g. the estimated time for an ACK to travel from the receiver node to the sender node when the receiver node delays sending the ACK to piggyback it with some outgoing data). For example, the lower bound can be set to twice the delayed ACK value. Thus, by setting a lower bound in this manner can help limit the quench effect of spurious RTO retransmissions. That is the sender node is prevented from immediately going into slow start such that the effect of RTO is controlled so that the connection can quickly get back to full capacity transmissions. Additionally, in some embodiments, a lower bound is set to prevent negative effects on other nodes. That is, if the dynamic RTOmin is set too aggressively (e.g. too small) and another node is using a larger or passive RTOmin (e.g. conventional 1-3 seconds), the node with the aggressive RTOmin can prevent the node with the passive RTOmin from getting access to shared resources, such as bandwidth. So, in some embodiments, a lower bound is set to minimize the effect of the aggressive RTOmin on other nodes. It is to be understood that other factors can also be included in addition to or in lieu of those discussed above. For example, a service level agreement may indicate a maximum and/or minimum RTO value to meet the data transfer rates indicated in the service level agreement.

Figure 2:
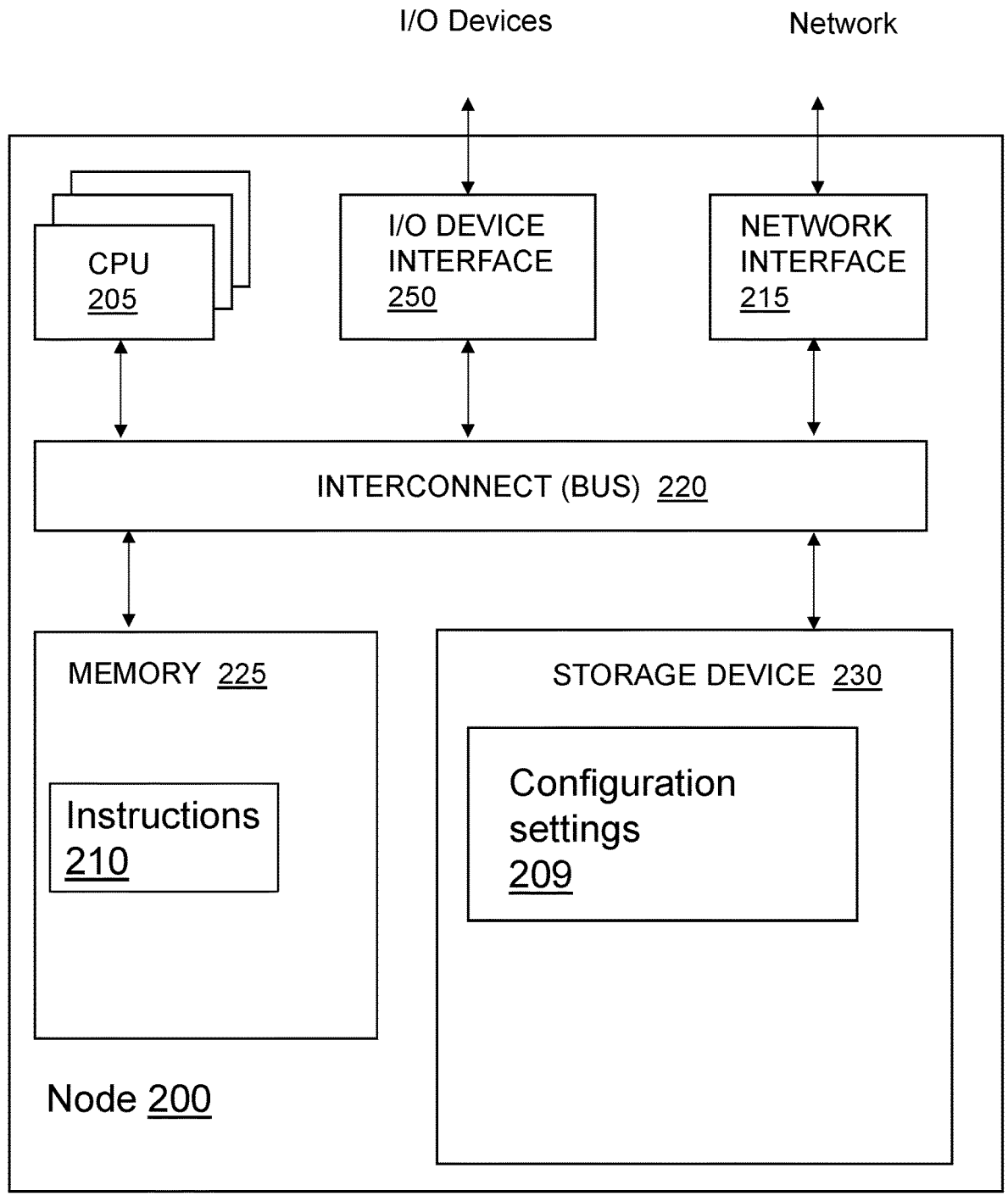
FIG. 2 is a high-level block diagram of one embodiment of an example node.

FIG. 2 is a high-level block diagram of one embodiment of an example node 200. The node 200 can be implemented as any of nodes 102 in FIG. 1. In the example shown in FIG. 2, the node 200 includes a memory 225, storage 230, an interconnect (e.g., BUS) 220, one or more processors 205 (also referred to as CPU 205 herein), and a network interface 215. It is to be understood that the node 200 is provided by way of example only and that the node 200 can be implemented differently in other embodiments. For example, in other embodiments, some of the components shown in FIG. 2 can be omitted and/or other components can be included.

Each CPU 205 retrieves and executes programming instructions stored in the memory 225 and/or storage 230. The interconnect 220 is used to move data, such as programming instructions, between the CPU 205, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the node 200 via a communication network coupled to the network interface 315.

In some embodiments, the memory 225 stores instructions 210 and the storage 230 stores configuration settings 209. This configuration settings 209 can include dynamically calculated/set RTOmin values for different connections, lower bounds on dynamic RTOmin values, etc., as discussed above. In other embodiments, the instructions 210 and the configuration settings 209 are stored partially in memory 225 and partially in storage 230, or they are stored entirely in memory 225 or entirely in storage 230, or they are accessed over a network via the network interface 215. Additionally, as discussed above, the configuration settings 209 can be stored in a database or memory device accessed via the network interface 215 rather than being locally attached or integrated with the node 200.

When executed, the instructions 210 cause the CPU 205 to analyze the data received over the network interface 215 as well as configuration settings 209 in order to perform the functionality discussed above with respect to nodes 102 for dynamically calculating and setting an RTOmin based on the network location of the respective receiver node. Further details regarding operation of the node 200 are also described below with respect to methods 300 and 400.

Figure 3:
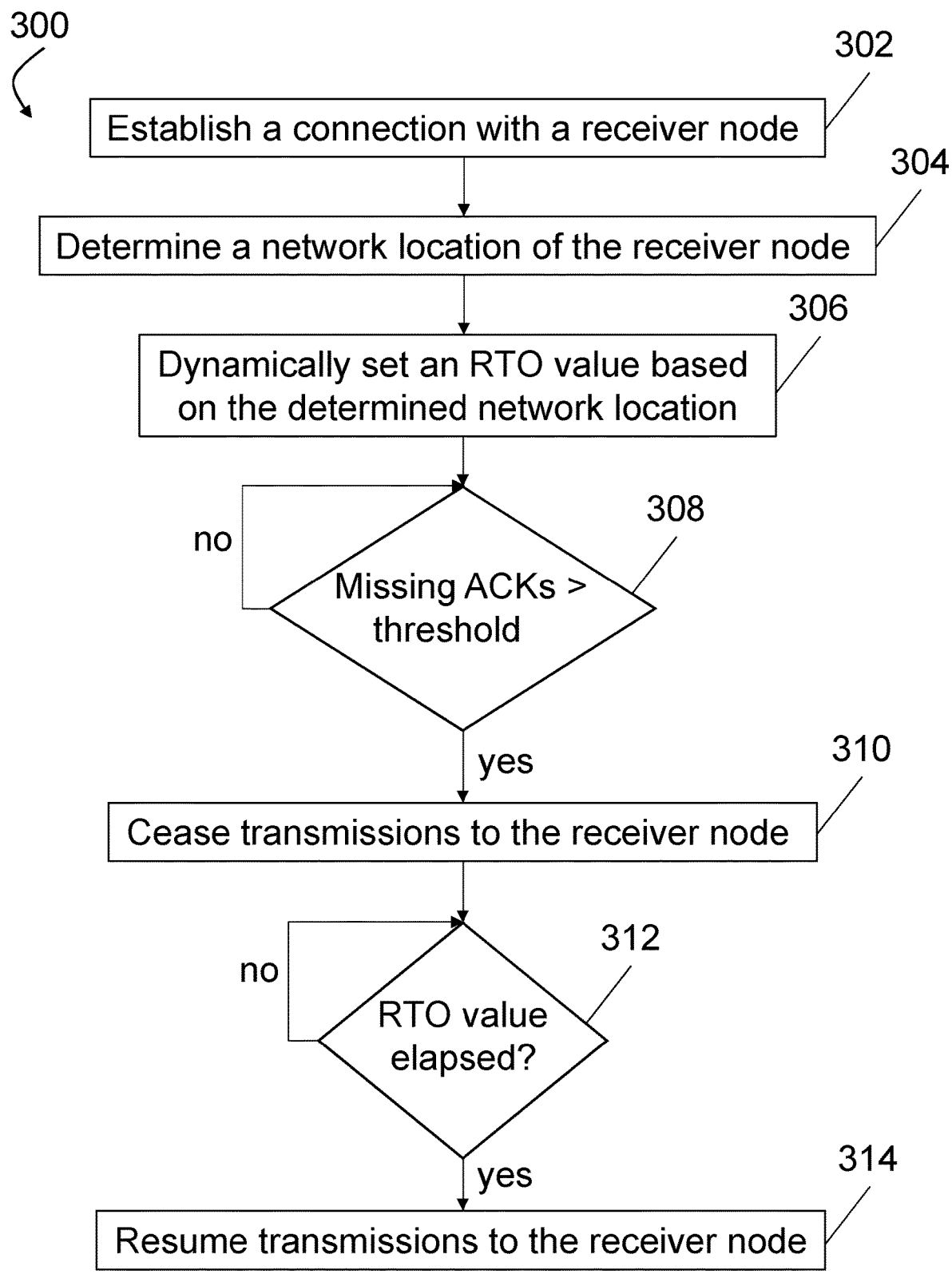
FIG. 3 is a flow chart of one embodiment of a method of dynamically setting Retransmission TimeOut (RTO) values.

FIG. 3 is a flow chart of one embodiment of a method 300 of dynamically setting Retransmission TimeOut (RTO) values. The method 300 can be implemented by a node, such as nodes 102 or 200 described above. For example, the method 300 can be implemented by a CPU, such as CPU 205 in node 200, executing instructions, such as instructions 210. It is to be understood that the order of actions in example method 300 is provided for purposes of explanation and that the method can be performed in a different order in other embodiments. Similarly, it is to be understood that some actions can be omitted or additional actions can be included in other embodiments.

At block 302, a sender node establishes communication with one or more receiver nodes. For example, as discussed above, the sender node can establish communication with a receiver node by transmitting packets to and receiving packets from the receiver node using TCP. At block 304, the sender node determines a respective network location of each of the one or more receiver nodes. For example, as discussed above, various techniques, such as, but not limited to, examining IP addresses of packets received from the one or more receiver nodes can be analyzed to determine the respective network location of the one or more receiver nodes.

At block 306, the sender node dynamically sets a respective RTO value for the one or more receiver nodes based on the determined respective network locations of the one or more receiver nodes. As discussed above, each receiver node can be assigned a different RTO value based on the respective network location of the one or more receiver nodes. As discussed above, the respective RTO values can be set lower for certain connections than for others. For example, a receiver node in the same Kubernetes cluster or on the same subnet can have a shorter RTO value than a receiver node in the same LPAR, or a receiver node connected over a wide area network.

At 308, the sender node determines if a number of missing ACK messages from a given receiver node exceed a predetermined threshold. As discussed above, if the number of missing ACKs exceeds a predetermined number, then a retransmission timeout is triggered. In response to determining that the number of missing ACK message from the given receiver node exceeds the threshold, the sender node ceases transmissions to the given receiver node at block 310. The sender node will continue to stop transmissions to the given receiver node until it is determined at block 312 that the dynamically set RTO value for that given receiver node has elapsed. That is, upon triggering the retransmission timeout logic at block 308, the sender node starts a timer to determine when the dynamically set RTO time value has elapsed. In response to determining that the dynamically set RTO time value for the given receiver node has elapsed, the sender node resumes transmissions to the given receiver node. As understood by one of skill in the art, this can include slowing ramping up the number of transmissions sent to the given receiver node until reaching full transmission rate.

Thus, through dynamically setting a respective RTO value for receiver nodes based on each receiver nodes network location, the embodiments described herein enable the system to improve performance by reducing the delay caused in conventional systems due to retransmission timeouts. The embodiments described herein can also take into account other factors to minimize negative effects on other nodes, thereby further improving system performance by reducing delay and negative effects on other nodes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of adaptively setting Transmission Control Protocol (TCP) Retransmission TimeOut (RTO) values, the method comprising:
   establishing a connection between a sender node and a receiver node using TCP;
   determining, by the sender node, a network location of the receiver node relative to the sender node;
   dynamically setting, by the sender node, an RTO minimum value for the receiver node based on the determined network location of the receiver node relative to the sender node;
   establishing a second connection between the sender node a second receiver node using TCP;

determining, by the sender node, a second network location of the second receiver node relative to the sender node; and dynamically setting, by the sender node, a second RTO minimum value for the second receiver node based on the determined second network location of the second receiver node relative to the sender node.

2. The method of claim 1, wherein dynamically setting the RTO minimum value for the receiver node comprises:
setting the RTO minimum value to a first value in response to determining that the network location of the receiver node indicates that the sender node and the receiver node are on the same subnet;
setting the RTO minimum value to a second value in response to determining that the network location of the receiver node indicates that the sender node and the receiver node are not on the same subnet and that the sender node and the receiver node are on the same logical partition (LPAR), the first value being shorter than the second value; and
setting the RTO minimum value to a third value in response to determining that the network location of the receiver node indicates that the sender node and the receiver node are not on the same subnet and that the sender node and the receiver node are not on the same LPAR, the second value being shorter than the third value.

3. The method of claim 2, wherein the first value is on the order of 10s of milliseconds and the third value is on the order of the seconds.

4. The method of claim 1, wherein dynamically setting the RTO minimum value for the receiver node comprises setting the RTO minimum value to a first value in response to determining that the network location of the receiver node indicates that the sender node and the receiver node are implemented on a same virtual machine.

5. The method of claim 1, wherein dynamically setting the RTO minimum value for the receiver node further comprises dynamically setting the RTO minimum value based on a lower bound identified in a configuration setting for the sender node.

6. The method of claim 5, wherein the lower bound is determined as a factor of an estimated time value for an ACK message to travel from the receiver node to the sender node.

7. A node comprising:
a network interface;
a memory; and
a processor communicatively coupled to the memory and to the network interface, wherein the processor is configured to establish a connection with a receiver node by transmitting packets via the network interface to the receiver and receiving packets via the network interface from the receiver;
wherein the processor is further configured to determine a network location of the receiver node relative to the node and to dynamically set a Retransmission TimeOut (RTO) value stored in the memory for the receiver node based on the determined network location of the receiver node;
wherein the processor is configured to dynamically set the RTO minimum value for the receiver node by:
setting the RTO minimum value to a first value in response to determining that the network location of the receiver node indicates that the node and the receiver node are on the same subnet;
setting the RTO minimum value to a second value in response to determining that the network location of the receiver node indicates that the node and the receiver node are not on the same subnet and that the node and the receiver node are on the same logical partition (LPAR), the first value being shorter than the second value; and
setting the RTO minimum value to a third value in response to determining that the network location of the receiver node indicates that the node and the receiver node are not on the same subnet and that the node and the receiver node are not on the same LPAR, the second value being shorter than the third value.

8. The node of claim 7, wherein the processor is further configured to:
establish a second connection via the network interface with a second receiver node;
determine a second network location of the second receiver node relative to the sender node; and
dynamically set a second RTO minimum value for the second receiver node stored in the memory based on the determined second network location of the second receiver node.

9. The node of claim 7, wherein the first value is on the order of 10s of milliseconds.

10. The node of claim 7, wherein the processor is configured to determine the network location of the receiver node by analyzing an Internet Protocol (IP) address in a header of packets received from the receiver node.

11. The node of claim 7, wherein the processor is further configured to dynamically set the RTO minimum value for the receiver node based on a lower bound identified in a configuration setting stored in the memory.

12. The node of claim 11, wherein the lower bound is determined as a factor of an estimated time value for an ACK message to travel from the receiver node to the node.

13. A computer program product comprising a non-transitory computer readable storage medium having a computer readable program stored therein, wherein the computer readable program, when executed by a processor, causes the processor to:
establish a connection with a receiver node by transmitting packets to and receiving packets from the receiver node;
determine a network location of the receiver node relative to the processor;
dynamically set a Retransmission TimeOut (RTO) value for the receiver node based on the determined network location of the receiver node;
determine that a number of missing ACK messages from the receiver node exceeds a predetermined threshold;
ceasing transmission of packets to the receiver node in response to determining that the number of missing ACK messages exceeds the predetermined threshold; and
resuming transmission of packets to the receiver node after the dynamically set RTO minimum value has elapsed.

14. The computer program product of claim 13, wherein the computer readable program is further configured to cause the processor to:
establish a second connection with a second receiver node;
determine a second network location of the second receiver node relative to the processor; and dynamically set a second RTO minimum value for the second receiver node based on the determined second network location of the second receiver node.

15. The computer program product of claim 13, wherein the computer readable program is further configured to cause the processor to dynamically set the RTO minimum value for the receiver node by:

setting the RTO minimum value to a first value in response to determining that the network location of the receiver node indicates that the processor and the receiver node are on the same subnet;

setting the RTO minimum value to a second value in response to determining that the network location of the receiver node indicates that the processor and the receiver node are not on the same subnet and that the processor and the receiver node are on the same logical partition (LPAR), the first value being shorter than the second value; and setting the RTO minimum value to a third value in response to determining that the network location of the receiver node indicates that the processor and the receiver node are not on the same subnet and that the processor and the receiver node are not on the same LPAR, the second value being shorter than the third value.

16. The computer program product of claim 13, wherein the computer readable program is further configured to cause the processor to determine the network location of the receiver node by analyzing an Internet Protocol (IP) address in a header of packets received from the receiver node.

17. The computer program product of claim 13, wherein the computer readable program is further configured to cause the processor to dynamically set the RTO minimum value for the receiver node based on a lower bound identified in a configuration setting stored in the memory.

* * * * *